(12) United States Patent
Allen et al.

(10) Patent No.: US 10,354,041 B2
(45) Date of Patent: Jul. 16, 2019

(54) PROCESS FOR IMPROVING CAPACITANCE EXTRACTION PERFORMANCE

(71) Applicant: International Business Machines Corporation, Armonk, NY (US)

(72) Inventors: Robert J. Allen, Jericho, VT (US); Susan E. Cellier, Hopewell Junction, NY (US); Lewis W. Dewey, III, Wappingers Falls, NY (US); Anthony D. Hagin, Poughkeepsie, NY (US); Adam P. Matheny, Beacon, NY (US); Ronald D. Rose, Essex Junction, VT (US); David J. Widiger, Pflugerville, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

(21) Appl. No.: 15/832,249

(22) Filed: Dec. 5, 2017

(65) Prior Publication Data
US 2018/0082009 A1 Mar. 22, 2018

Related U.S. Application Data

(63) Continuation of application No. 14/962,185, filed on Dec. 8, 2015, now Pat. No. 9,886,541.

(51) Int. Cl.
*G06F 17/50* (2006.01)

(52) U.S. Cl.
CPC ...... *G06F 17/5077* (2013.01); *G06F 17/5081* (2013.01); *G06F 2217/82* (2013.01)

(58) Field of Classification Search
USPC .......................................... 716/127
See application file for complete search history.

(56) References Cited

U.S. PATENT DOCUMENTS

| 5,901,063 | A  | * | 5/1999  | Chang    | G06F 17/5081 |
|-----------|----|---|---------|----------|--------------|
|           |    |   |         |          | 703/5        |
| 6,536,022 | B1 | * | 3/2003  | Aingaran | G06F 17/5036 |
|           |    |   |         |          | 716/115      |
| 7,373,620 | B1 |   | 5/2008  | Lenahan  |              |
| 9,779,193 | B1 |   | 10/2017 | Ginetti et al. |        |
| 2005/0114054 | A1 | * | 5/2005 | Shimazaki | G01R 29/26 |
|           |    |   |         |          | 702/69       |
| 2012/0260225 | A1 |   | 10/2012 | Su et al. |          |

* cited by examiner

*Primary Examiner* — Bryce M Aisaka
(74) *Attorney, Agent, or Firm* — Cantor Colburn LLP; Steven Meyers

(57) ABSTRACT

Disclosed is a method for improving capacitance extraction performance in a circuit, the method including mapping, via a computing resource, a first layout including a plurality of wiring paths, selecting at least one target wire from the plurality of wiring paths, selecting at least one group of wires running orthogonally to the at least one target wire, identifying and selecting within the at least one group at least one set of two or more wires that are combinable for representation as a single merged wire, mapping a second layout, via the computing resource, and representing the at least one set of two or more wires as the single merged wire in said second layout, analyzing parasitic capacitance between the at least one target wire and the at least one group of wires using the second layout, and manufacturing the circuit using information from the analyzing of parasitic capacitance.

1 Claim, 4 Drawing Sheets

PROCESS FOR IMPROVING CAPACITANCE EXTRACTION PERFORMANCE

DOMESTIC BENEFIT/NATIONAL STAGE INFORMATION

This application is a continuation of U.S. application Ser. No. 14/962,185 filed on Dec. 8, 2015. The entire disclosures of U.S. application Ser. No. 14/962,185 are incorporated herein by reference.

BACKGROUND

The present invention generally relates to a process for improving capacitance extraction performance in a circuit, and more specifically, to a process for more efficiently estimating parasitic capacitance that may be present in the wiring paths in a VLSI (very large scale integrated) chip.

As VLSI chips have scaled over the decades, interconnect or wire width and spacing has also scaled. If not properly designed, this scaling can be a limiter of circuit performance. For example, unintended capacitive coupling between two wires that are next to each other can often occur. When this happens, one signal can capacitively couple with another and cause what appears to be noise. As such, it is crucial to accurately estimate parasitic capacitance that may be created by proposed wiring paths prior to actually manufacturing a circuit.

Notably, global interconnects will have very large numbers of nets and shapes making up the nets, which can strain memory. Conventional processes, such as that which is taught in U.S. Pat. No. 6,061,508, which is hereby incorporated by reference in its entirety, involve collecting the coordinates of at least one interconnect, identifying and classifying each metal layer within the region of the interconnect, identifying the edges of the interconnect, identifying neighboring interconnects in a direction perpendicular to each side of the original interconnect, and calculating the parasitic capacitance between the original interconnect and all neighboring interconnect shape edges.

However, one drawback to this type of process is time. Indeed, extraction of a large flat core can take many hours (>12). Accordingly, a system and method for more efficiently estimating parasitic capacitance without sacrificing accuracy would be beneficial.

SUMMARY

Disclosed is a method for improving capacitance extraction performance in a circuit, the method including mapping, via a computing resource, a first layout including a plurality of wiring paths, selecting at least one target wire from the plurality of wiring paths in the first layout, selecting at least one group of wires running orthogonally to the at least one target wire, the at least one group of wires being disposed at least one of above and below the at least one target wire, identifying and selecting within the at least one group at least one set of two or more wires that are combinable for representation as a single merged wire, mapping a second layout, via the computing resource, and representing the at least one set of two or more wires as the single merged wire in said second layout, analyzing parasitic capacitance between the at least one target wire and the at least one group of wires using the second layout, and manufacturing the circuit using information gathered from the analyzing of the parasitic capacitance.

Further disclosed is a computer program product for improving capacitance extraction performance in a circuit, the computer program product including a storage medium readable by a processing circuit of a computing resource and storing instructions for execution by the processing circuit for facilitating a method including mapping, via the computing resource, a first layout including a plurality of wiring paths, selecting at least one target wire from the plurality of wiring paths in the first layout, selecting at least one group of wires running orthogonally to the at least one target wire, the at least one group of wires being disposed at least one of above and below the at least one target wire, identifying and selecting within the at least one group at least one set of two or more wires that are combinable for representation as a single merged wire, mapping a second layout, via the computing resource, and representing the at least one set of two or more wires as the single merged wire in the second layout, analyzing parasitic capacitance between the at least one target wire and the at least one group of wires using the second layout, and manufacturing the circuit using information gathered from the analyzing of the parasitic capacitance.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
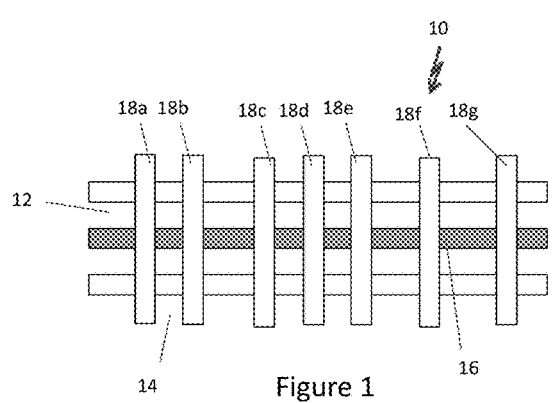
FIG. 1 is an upper schematic view of a portion of a wiring path layout as mapped by a computing resource.

FIG. 1 shows a portion 10 of a wiring path layout as mapped (and optionally displayed on a screen or other viewing medium) by a computing resource. As is shown here, and is typical for a VLSI chip, the wiring runs in orthogonal directions on consecutive metal levels or layers, in this case levels 12 and 14. The particular wiring path targeted for routing analysis in the exemplary embodiment of FIG. 1, which is effectively prior art, is represented by wire 16 in level 12. The metal (used synonymously with "wire" herein) in level 14 shown above (or laid on) target wire 16 runs in a direction orthogonal to target wire 16. Similarly, metal directly below the target wire 16 (and target level 12) also runs in a direction orthogonal to target wire 16, though this is not shown in FIG. 1 (see FIGS. 3 and 4 for the level immediately below target wire 16). Metal two layers above a target 16 would be in a direction parallel thereto, though this is not shown in the Figures.

Like the other wires mapped in the layout, parasitic capacitance present for target wire 16 needs to be estimated. In a conventional analysis, this estimation (or capacitance extraction) in the portion 10 would at least in part be analyzed based on the seven wires 18a, 18b, 18c, 18d, 18e, 18f, and 18g in level 14 that run orthogonally over wire 16. Accordingly, the analysis would have to consider each of these wires 18a, 18b, 18c, 18d, 18e, 18f, and 18g in performing capacitance extraction for target wire 16. In other words, parasitic capacitance between the target wire 16 and all orthogonally running wires 18a, 18b, 18c, 18d, 18e, 18f, and 18g in level 14 would have to be calculated by the computing resource.

However, as has been found by the inventors responsible for the concept disclosed herein, when wiring on orthogonal wires immediately above or below a target level, such as target level 12 with target wire 16, are spaced at ground-rule minimum distances, the effect that it has on capacitance extraction is the same as if those wires were merged into a single wide wire. As such, the computing resource may be programmed/instructed to identify wires spaced at a desired distance (up to three time the ground rule minimum distance in an exemplary embodiment), and effectively group these wires such that they are represented and analyzed as one broad wire. This is what is shown in the newly configured or second mapped portion 20 of the wiring path layout as shown in the exemplary embodiment of FIG. 2, and optionally displayed by the computing resource on a screen or other viewing medium.

Figure 2:
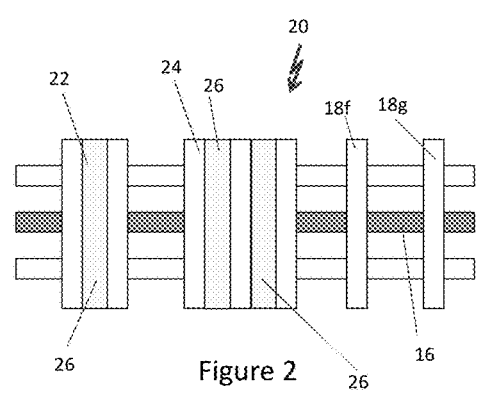
FIG. 2 shows the portion of the wiring path layout of from the view of FIG. 1 according to embodiments of the present invention.

Indeed, as shown in the exemplary embodiment of FIG. 2, the analysis has identified wires 18a and 18b in level 14 as shown in FIG. 1, as well as wires 18c, 18d, and 18e as are also shown in FIG. 1, to be mapped sufficiently close to each other to be represented and analyzed as a single wire 22 (including wires 18a and 18b) and another single wire 24 (including wires 18c, 18d, and 18e). The identified, desirable distances between the wires 18a and 18b, as well as 18c, 18d, and 18e, are represented and analyzed as further metal areas that will be referred to as metal fill 26. Via this metal fill 26, what were once two wires 18a and 18b running orthogonally over target wire 16 in the portion 10 shown in FIG. 1, can now be treated for purposes of analysis as one wire 22 in the portion 20 shown in FIG. 2. Similarly, what were once three wires 18c, 18d, and 18e running orthogonally over target wire 16 in the portion 10 shown in FIG. 1, can now be treated for purposes of analysis as one wire 24 in the portion 20 shown in FIG. 2.

Accordingly, instead of having to analyze and calculate parasitic capacitance between the target wire 16 and seven orthogonally running wires 18a, 18, 18c, 18d, 18e, 18f, and 18g in level 14 of mapped portion 10 (as shown in FIG. 1), the computing resource merely has to analyze and calculate parasitic capacitance between the target wire 16 and four orthogonally running wires 22, 24, 18f, and 18g in level 14 of the newly mapped portion 20 (as shown in FIG. 2). Of course, it may not be feasible to convert all of the mapped wires into one broad wire, and in the exemplary embodiment shown in FIG. 2 this is schematically demonstrated by wire 18f being spaced at a distance greater than the desired distance from wire 18e, and wire 18g being spaced at a distance greater than the desired distance from wire 18f. However, when the vast quantity of layers and wires within a VLSI chip is considered, it becomes apparent that the type of grouping shown in FIG. 2 could yield substantial benefit relative to efficiency of the overall capacitance extraction preformed on the chip. A further area of the chip, but still one proximate target wire 16 and disposed in portions 10 and 20 will be discussed below with reference to FIGS. 3 and 4.

Figure 3:
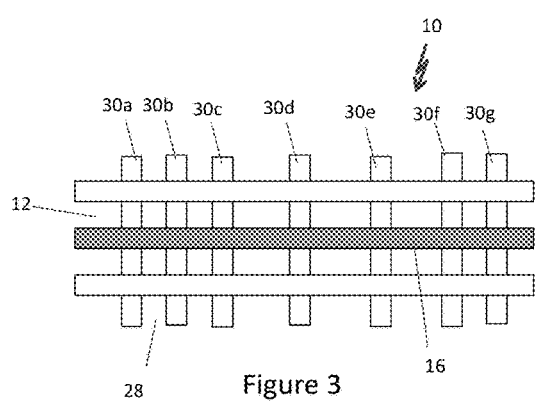
FIG. 3 is a lower schematic view of the portion of the wiring path layout as mapped and displayed by a computing resource.
Figure 4:
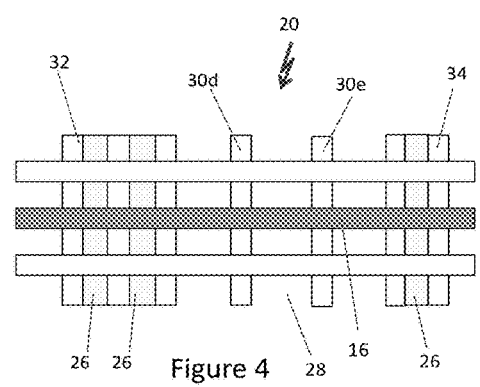
FIG. 4 shows the portion of the wiring path layout of from the view of FIG. 3 according to embodiments of the present invention.

Referring now to FIGS. 3 and 4, the upper layer 14 has been removed so that the level 28 immediately below target layer 12 with target wire 16 may be schematically viewed and described. Similarly to FIG. 1, FIG. 3 shows the portion 10 as would be initially mapped by the computing resource. Here, like with layer 14, parasitic capacitance present for target wire 16 needs to be estimated relative to the wires in level 28. In a conventional analysis, this estimation (or capacitance extraction) in the portion 10 would again be at least in part analyzed based on the seven wires 30a, 30b, 30c, 30d, 30e, 30f, and 30g in level 28 that run orthogonally under wire 16. Accordingly, the analysis would have to consider each of these wires 30a, 30b, 30c, 30d, 30e, 30f, and 30g in performing capacitance extraction for target wire 16. In other words, parasitic capacitance between the target wire 16 and all orthogonally running wires 30a, 30b, 30c, 30d, 30e, 30f, and 30g in level 28 below level 12 would have to be calculated by the computing resource.

However, as was discussed with reference to upper level 14 above, the computing resource may here again be programmed/instructed to identify wires spaced at a desired distance, and effectively group these wires such that they are represented and analyzed as one broad wire. In the case of FIG. 4, this grouping can be seen in lower level 28 of the second mapped portion 20, as opposed to upper level 14.

Indeed, as shown in the exemplary embodiment of FIG. 4, while the groupings occur in a spatially different manner than that shown in FIG. 2, the analysis has nonetheless identified the wires 30a, 30b, and 30c in level 28 as shown in FIG. 3, as well as the wires 30f and 30g as are also shown in FIG. 3, to be mapped sufficiently close to each other to be represented and analyzed as a single wire 32 (including wires 30a, 30b, and 30c) and another single wire 34 (including wires 30f and 30g). The identified, desired distances between the wires 30a, 30b, and 30c, as well as wires 30f and 30g, also include metal fill 26. Here again, via this metal fill 26, what were once three wires 30a, 30b, and 30c running orthogonally under target wire 16 in the portion 10 shown in FIG. 3, can now be treated for purposes of analysis as one wire 32 in the portion 20 shown in FIG. 4. Similarly, what were once two wires 30f and 30g running orthogonally under target wire 16 in the portion 10 shown in FIG. 3, can now be treated for purposes of analysis as one wire 34 in the portion 20 shown in FIG. 4.

Accordingly, and once again, instead of having to analyze and calculate parasitic capacitance between the target wire 16 and seven orthogonally running wires 30a, 30b, 30c, 30d, 30e, 30f, and 30g in level 28 of mapped portion 10 (as shown in FIG. 3), the computing resource merely has to analyze and calculate parasitic capacitance between the target wire 16 and four orthogonally running wires 32, 30d, 30e, and 34 in level 28 of the newly mapped portion 20 (as shown in FIG. 4).

Once the "above and below" capacitance extraction analysis as described above has been completed for all of the paths/wires in the VLSI chip, the grouped wires (such as wires 22, 24, 32, and 34) may be separated or ungrouped for post process operations. In other words, prior to at least some post process operations the circuit will be returned to the ungrouped mapping such as that shown in the exemplary portion 10. One such post process operation that may occur after "ungrouping" includes chip manufacture as informed by any parasitic capacitance information gathered by the more efficient capacitance extraction process discussed above.

In addition, before proceeding with one or more of the above discussed post process application (particularly the manufacturing of the chip), it should be appreciated that a further benefit can be achieved by apportioning the total capacitance from the target wire 16 to the grouping into two or more capacitances from the target wire (16) to each of the originally mapped orthogonal wires that were used to make up the grouping. Using FIG. 1 as an example, via such apportioning capacitances from three individual wires may be obtained using only the CPU time and memory required for obtaining capacitance of one wire. For instance, after calculating the capacitance from 16 to grouping 24 (as shown in FIG. 2), the total capacitance calculated for 16 to grouping 24 can be apportioned into three values, one from 16 to wire 18c (from FIG. 1), one from 16 to wire 18d (from FIG. 1), and one from 16 to wire 18e (of FIG. 1), thereby obtaining all three individual capacitances from wires 18c-18e, without significant loss of accuracy, but for the CPU time of computing just one capacitance.

It should be appreciated that the above discussed process may allow for a 50% reduction in the time it takes to complete capacitance extraction for a VLSI chip. This allows for extraction to be reduced from about twelve hours to about six hours for a large flat core VLSI chip, such as those 750,000 to over a million nets.

Figure 5:
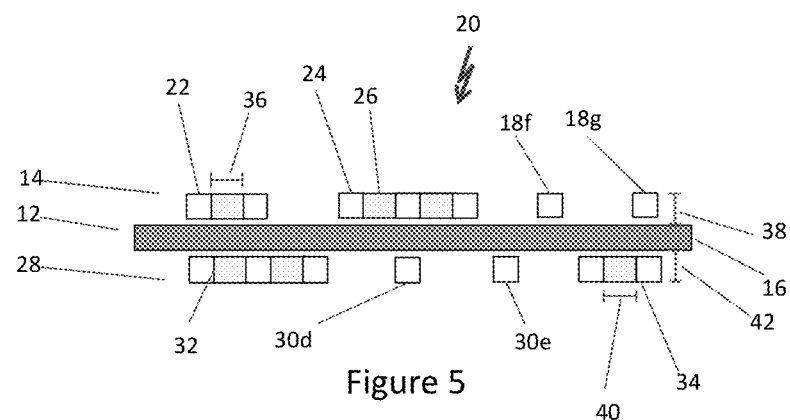
FIG. 5 is a sectional side view combining the portions of the wiring path layout shown in FIGS. 2 and 4 in an exemplary embodiment.

In addition, and as shown in FIG. 5, it should also be appreciated that, in an exemplary embodiment, the desired distance discussed above and shown as a width 36 of the fill area 26 in upper level 14 may be defined to be no greater than a distance 38 between the uppermost extent of the target wire 16 and the uppermost extent of the crossing wires 22, 24, 18f, and 18g in upper level 14. Similarly, and as is also shown in FIG. 5, it should also be appreciated that, in an exemplary embodiment, the desired distance discussed above and shown as a width 40 of the fill area 26 in lower level 28 may be defined to be and no greater than a distance 42 between the lowermost extent of the target wire 16 and the lowermost extent of the crossing wires 32, 30d, 30e, and 34 in lower level 28. Of course, these distances 38 and 42 may be multiplied by a desirable factor in order calculate the distances 36 and 40. For example, the distance 36 and 40 may be desirably set a distance 38 multiplied by factor x and distance 42 multiplied by factor x respectively. The exact value of the factor x would depend on the specific technology, and be empirically determined.

Figure 5A:
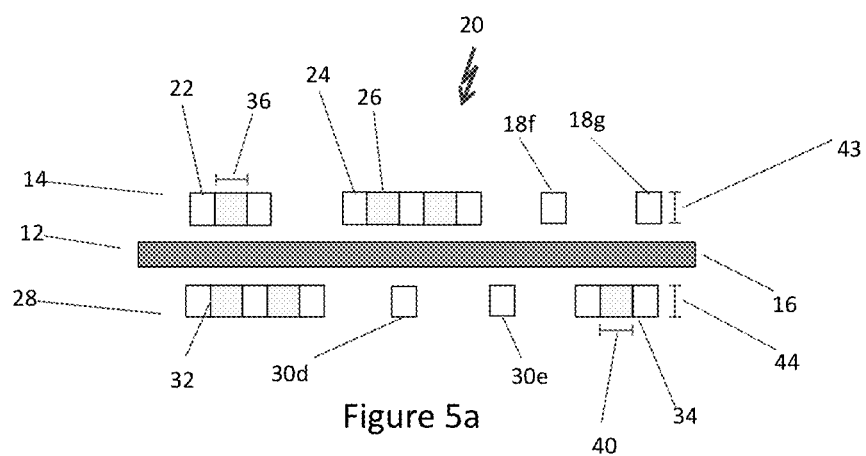
FIG. 5a is another sectional side view combining the portions of the wiring path layout shown in FIGS. 2 and 4 in an another exemplary embodiment.

With reference to FIG. 5a, in another, alternative exemplary embodiment the desired distance discussed above and shown as a width 36 of the fill area 26 in upper level 14 may be defined to be no greater than a distance derived from the height 43 of the crossing wires 22, 24, 18f, and 18g in upper level 14. Similarly, and as is also shown in FIG. 5a, it should also be appreciated that, in an exemplary embodiment, the desired distance discussed above derived shown as a width 40 of the crossing wires of the fill area 26 in lower level 28 may be defined to be and no greater than a distance derived from the height 44 of the crossing wires 32, 30d, 30e, and 34 in lower level 28. The derivation suggested above may be as simple as multiplying by a desirable factor in order to calculate the distances 36 and 40. For example, the distance 36 and 40 may be desirably set as a distance 43 multiplied by factor x and distance 44 multiplied by factor x respectively. The exact value of the factor x would depend on the specific technology, may be different for each layer pair, and be empirically determined.

Having described the above to examples pertaining to defining and selecting the desired distance, it should be appreciated the process is in no way limited to these examples. Indeed, the distance may generally be derived in any desirable manner, such as but not limited to use of some combination of the spacing between the wiring layers and the thickness of the crossing wiring layer.

Figure 6:
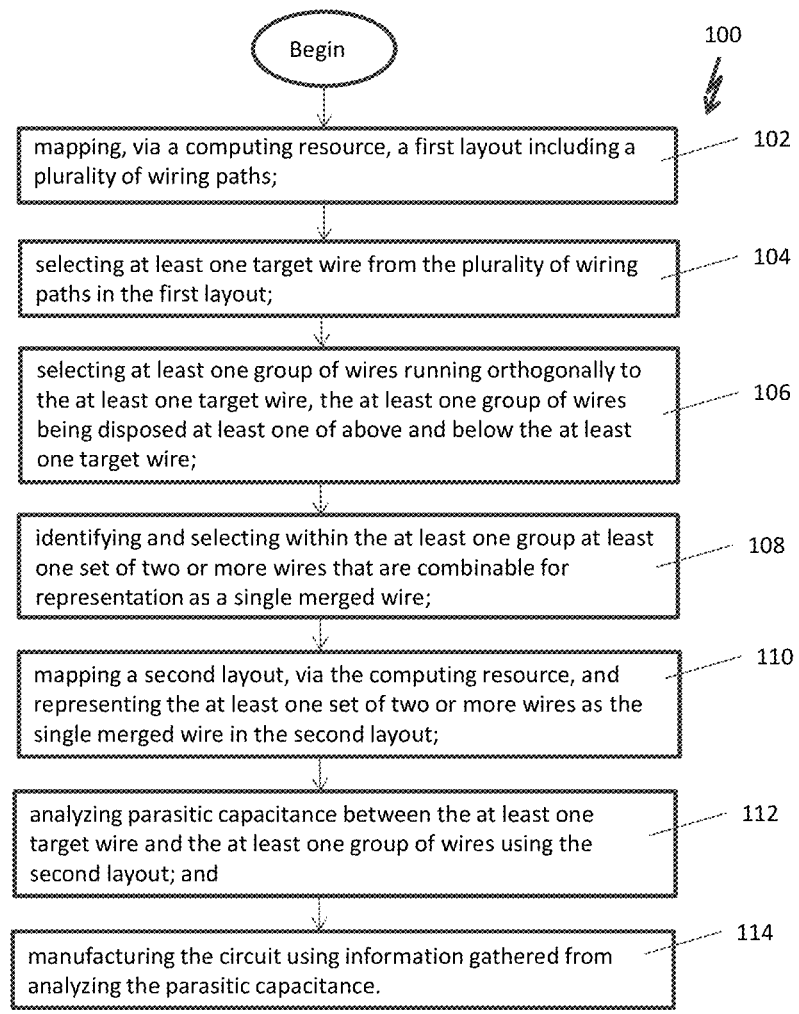
FIG. 6 is a block diagram showing a method for improving capacitance extraction performance in a circuit.

FIG. 6 shows an example of a method 100 method for improving capacitance extraction performance in a circuit according to an exemplary embodiment of the present invention. At a block 102 a first layout including a plurality of wiring paths is mapped (and optionally displayed) using a computing resource. Of course, while the layouts discussed herein generally refer to layout areas as shown at portions 10 and 20 of the Figures, it should be appreciated that any layouts discussed herein may include the routing information for each wire in a circuit or chip.

At block 104 a target wire is selected from the plurality of wiring paths in the first mapped layout. Of course, this selection as a target wire may occur for multiple or all of the wires in the circuit.

At a block 106 at least one group of wires running orthogonally to the target wire is selected. This group may include wires that run in a level above and/or below the selected target wire.

At a block 108 at least one set of two or more wires within the at least one group may be identified and selected for combinability and representation as a single merged wire. This allows multiple groups of individual wires to be treated as single wires in a capacitance extraction analysis.

At a block 110 mapping a second layout is mapped using the computing resource, and the sets of two or more wires are represented as single merged wires in this second layout. This mapping may optionally be displayed by the computing resource.

At a block 112 parasitic capacitance between the at least one target wire and the at least one group of wires is analyzed using the second layout. As discussed above, the combining of multiple crossing wires into single crossing wires benefits analysis efficiency.

At a block 114 the circuit is manufactured using information gathered from the parasitic capacitance analysis of block 112. In an exemplary embodiment, the manufactured circuit may be used with a VLSI chip.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for improving capacitance extraction performance in a circuit, the method comprising:

mapping, via a computing resource, a first layout including a plurality of wiring paths;

selecting at least one target wire from said plurality of wiring paths in said first layout;

selecting at least one group of wires running orthogonally relative to said at least one target wire;

identifying and selecting within said at least one group at least one set of two or more wires that are combinable for representation as a single merged wire;

mapping a second layout, via said computing resource, and representing said at least one set of two or more wires as said single merged wire in said second layout;

analyzing parasitic capacitance between said at least one target wire and said at least one group of wires using said second layout; and manufacturing the circuit using information gathered from said analyzing of said parasitic capacitance, wherein:

the at least one set of two or more wires are chosen to be combined into the single wire based on presence of a desirable distance between at least two wires in the at least one set of two or more wires, the at least one group of wires is above or below the at least one target wire, and the desirable distance is defined by a height of at least one wire in the at least one group of wires or a distance between:
an upper extent of the at least one target wire to an upper extent of the at least one group of wires, or
a lower extent of the at least one target wire to a lower extent of the at least one group of wires.

\* \* \* \* \*